US007716047B2

(12) United States Patent
Hernandez-Abrego et al.

(10) Patent No.: US 7,716,047 B2
(45) Date of Patent: May 11, 2010

(54) SYSTEM AND METHOD FOR AN AUTOMATIC SET-UP OF SPEECH RECOGNITION ENGINES

(75) Inventors: Gustavo Hernandez-Abrego, San Jose, CA (US); Xavier Menendez-Pidal, Los Gotos, CA (US); Thomas Kemp, Esslingen (DE); Katsuki Minamino, Tokyo (JP); Helmut Lucke, Tokyo (JP)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1259 days.

(21) Appl. No.: 10/403,730

(22) Filed: Mar. 31, 2003

(65) Prior Publication Data

US 2004/0078198 A1    Apr. 22, 2004

Related U.S. Application Data

(60) Provisional application No. 60/418,890, filed on Oct. 16, 2002.

(51) Int. Cl.
*G10L 15/00*    (2006.01)
*G06F 15/18*    (2006.01)

(52) U.S. Cl. ............................ 704/236; 704/231; 706/1

(58) Field of Classification Search ........................ None
See application file for complete search history.

(56) References Cited

U.S. PATENT DOCUMENTS

| | | | | |
|---|---|---|---|---|
| 5,544,279 A * | 8/1996 | Li et al. | ........................... | 706/1 |
| 5,751,915 A * | 5/1998 | Werbos | ........................... | 706/4 |
| 5,864,810 A * | 1/1999 | Digalakis et al. | ............. | 704/255 |
| 6,321,194 B1 * | 11/2001 | Berestesky | .................. | 704/232 |
| 7,024,366 B1 * | 4/2006 | Deyoe et al. | ............. | 704/270.1 |

OTHER PUBLICATIONS

D. Torre Toledano at al, "Trying to Mimic Human Segmentation of Speech Using HMM and Fuzzy Logic Post-Correction Rules" Proceedings of the 3rd ESCA/COSCOSDA International Workshop on Speech Synthesis, Nov. 1998.*

Christopher Hale, CamQuynh Nguyen "Voice Command Recognition Using Fuzzy Logic" WESCON 95 Conference Record, Nov. 1995, pp. 608-613.*

(Continued)

*Primary Examiner*—Richemond Dorvil
*Assistant Examiner*—Matthew H Baker
(74) *Attorney, Agent, or Firm*—Gregory J. Koerner; Redwood Patent Law

(57) ABSTRACT

A system and method for an automatic set-up of speech recognition engines may include a speech recognizer configured to perform speech recognition procedures to identify input speech data according to one or more operating parameters. A merit manager may be utilized to automatically calculate merit values corresponding to the foregoing recognition procedures. These merit values may incorporate recognition accuracy information, recognition speed information, and a user-specified weighting factor that shifts the relative effect of the recognition accuracy information and the recognition speed information on the merit values. The merit manager may then automatically perform a merit value optimization procedure to select operating parameters that correspond to an optimal one of the merit values.

26 Claims, 7 Drawing Sheets

OTHER PUBLICATIONS

Paul Bao, Albert Sim "A Hybrid Speech Recognition Model Based on HMM and Fuzzy PPM" IEEE International Conference Systems, Man and Cybernetics, Oct. 11-14, 1998, vol. 5 pp. 4148-4153.*

Jiping Sun, Fakhri Karray, Otman Basir, Mohamed Kamel, "Natural Language Understanding Through Fuzzy Logic Inference and its Application to Speech Recognition" 2002 International Conference Proceedings Fuzzy Systems, May 12-17, 2002, vol. 2 pp. 1120-1125.*

Jerry M. Mendel "Fuzzy Logic Systems for Engineering: A Tutorial" Proceedings of the IEEE, vol. 83 Issue 3, Mar. 1995, pp. 345-377.*

Chia-Feng Juang "Noisy Speech Processing by Recurrently Adaptive Fuzzy Filters" IEEE Transations Fuzzy Systems, vol. 9 Issue 1, Feb. 2001, pp. 139-152.*

Joseph Picone "Continuous Speech recognition Using Hidden Markov Models" IEEE ASSP Magazine, vol. 7 Issue 3 ,Jul. 1990, pp. 26-41.*

Mu-Song Chen "A Comparitive Study of Learning Methods in Tuning Paramaeters of Fuzzy Membership Functions" IEEE SMC Conference Proceedings System,Man Cybernetics, Oct. 12-15, 1999, vol. 3, pp. 40-44.*

Hernandez-Abrego et al, "Fuzzy reasoning in confidence evaluation of speech recognition" IEEE International Workshop on Inteligent Signal Processing, WISP'99, Sep. 1999.*

Suhm et al, "Interactive Recovery from Speech Recognition Errors in Speech User Interfaces" 4th International COnference on Spoken Language, ICSLP 96, Oct. 3-6, 1996, vol. 2, pp. 865-868.*

Venkataraman, "Gradient Descent/Ascent", http://www.speech.sri.com/people/anand/771/htmlnode33.html, Sep. 16, 1999.*

Jebara, "Maximizing with Bounds: Beyond Gradient Ascent", http://vismod.media.mit.edu/tech-reports/TR-507/node40.html, Sep. 15, 1999.*

Schulter et al, "Comparison of disriminative training criteria and optimization methods for speech recognition", Speech Communication, vol. 34, Issue 3 (Jun. 2001) pp. 287-310.*

* cited by examiner

410(c)

410(b)

410(a)

RULE 1: If WER is low and RTF is low and WOT is low, then z = 1

RULE 2: If WER is low and RTF is low and WOT is high, then z = 1

RULE 3: If WER is low and RTF is high and WOT is low, then z = 0

RULE 4: If WER is low and RTF is high and WOT is high, then z = 1

RULE 5: If WER is high and RTF is low and WOT is low, then z = 1

RULE 6: If WER is high and RTF is low and WOT is high, then z = 0

RULE 7: If WER is high and RTF is high and WOT is low, then z = 0

RULE 8: If WER is high and RTF is high and WOT is high, then z = 0

SYSTEM AND METHOD FOR AN AUTOMATIC SET-UP OF SPEECH RECOGNITION ENGINES

CROSS-REFERENCE TO RELATED APPLICATIONS

This application relates to, and claims priority in, U.S. Provisional Patent Application Ser. No. 60/418,890, entitled "Automatic Set-Up For Speech Recognition Engines Based Upon Merit Optimization," filed on Oct. 16, 2002. The foregoing related application is commonly assigned, and is hereby incorporated by reference.

BACKGROUND SECTION

1. Field of the Invention

This invention relates generally to electronic speech recognition systems, and relates more particularly to a system and method for an automatic set-up of speech recognition engines.

2. Description of the Background Art

Implementing a robust and efficient method for system users to interface with electronic devices is a significant consideration of system designers and manufacturers. Voice-controlled operation of electronic devices is a desirable interface for many system users. For example, voice-controlled operation allows a user to perform other tasks simultaneously. For instance, a person may operate a vehicle and operate an electronic organizer by voice control at the same time. Hands-free operation of electronic systems may also be desirable for users who have physical limitations or other special requirements.

Hands-free operation of electronic devices may be implemented by various speech-activated electronic systems. Speech-activated electronic systems thus advantageously allow users to interface with electronic devices in situations where it would be inconvenient or potentially hazardous to utilize a traditional input device. Electronic entertainment systems may also utilize speech recognition techniques to allow users to interact with a system by speaking to it.

However, effectively implementing such systems may create substantial challenges for system designers. For example, enhanced demands for increased system functionality and performance may require more system processing power and require additional hardware resources. An increase in processing or hardware requirements may also result in a corresponding detrimental economic impact due to increased production costs and operational inefficiencies.

Furthermore, enhanced system capability to perform various advanced operations may provide additional benefits to a system user, but may also place increased demands on the control and management of various system components. Therefore, for all the foregoing reasons, implementing a robust and efficient method for a system user to interface with electronic devices remains a significant consideration of system designers and manufacturers.

SUMMARY

In accordance with the present invention, a system and method are disclosed for an automatic set-up of speech recognition engines. In one embodiment, a speech recognizer may be configured to perform speech recognition procedures to identify input speech data according to one or more operating parameters. A merit manager may be utilized to automatically calculate merit values corresponding to the foregoing recognition procedures.

These merit values may incorporate recognition accuracy information (WER), recognition speed information (RTF), and a user-specified weighting factor (WOT) that shifts the relative effect of the recognition accuracy information and the recognition speed information on the merit values. The merit manager may then automatically perform a merit value optimization procedure to advantageously select optimal operating parameters that correspond to an optimal one of the merit values.

In practice, a system user or other appropriate entity may first perform an initialization procedure to specify certain initialization values for the recognizer and merit manager to perform an automatic set-up procedure. For example, in certain embodiments, the foregoing initialization values may include, but are not limited to, the foregoing weighting value (WOT), initial operating parameters for the recognizer, a total number of optimization iterations (iteration limit) for the merit value optimization procedure, and movement restrictions for the merit value optimization procedure.

The recognizer may then perform a speech recognition procedure with input speech data to generate corresponding WER and RTF values. Next, a fuzzy logic module of the merit manager may utilize the foregoing WER, RTF, and WOT as input values to calculate a current merit value for the speech recognition procedure. Then, during an iteration of the merit value optimization procedure, the recognizer may perform several additional speech recognition procedures with different operating parameters so that the merit manager can compute adjacent merit values in the neighborhood of the current merit value.

The merit manager may also compute a gradient between the adjacent merit values and the current merit value. The merit manager may then select a new current merit value from among the calculated adjacent merit values based upon a maximum ascending direction of the foregoing gradient. Next, the merit manager may determine whether the pre-defined iteration limit has been reached. In the event that the pre-defined iteration limit has not been reached, then the process may return to repeat another iteration of the merit value optimization procedure.

However, if the pre-defined iteration limit has been reached, then the merit manager may set the operating parameters to the optimized values corresponding to the best merit value from all prior iterations of the merit value optimization process to thereby conclude the automatic set-up procedure, in accordance with the present invention. The present invention thus provides an effective system and method for an automatic set-up of speech recognition engines.

BRIEF DESCRIPTION OF THE DRAWINGS

FIG. 5 is a diagram of one embodiment of a fuzzy logic rule set, in accordance with the present invention;

DETAILED DESCRIPTION

The present invention relates to an improvement in speech recognition systems. The following description is presented to enable one of ordinary skill in the art to make and use the invention and is provided in the context of a patent application and its requirements. Various modifications to the preferred embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention comprises a system and method for an automatic set-up of speech recognition engines, and may include a speech recognizer configured to perform speech recognition procedures to identify input speech data according to one or more operating parameters. A merit manager may be utilized to automatically calculate merit values corresponding to the foregoing recognition procedures.

These merit values may incorporate recognition accuracy information, recognition speed information, and a user-specified weighting factor that shifts the relative effect of the recognition accuracy information and the recognition speed information on the merit values. The merit manager may then automatically perform a merit value optimization procedure to select operating parameters that correspond to an optimal one of the merit values.

Figure 1:
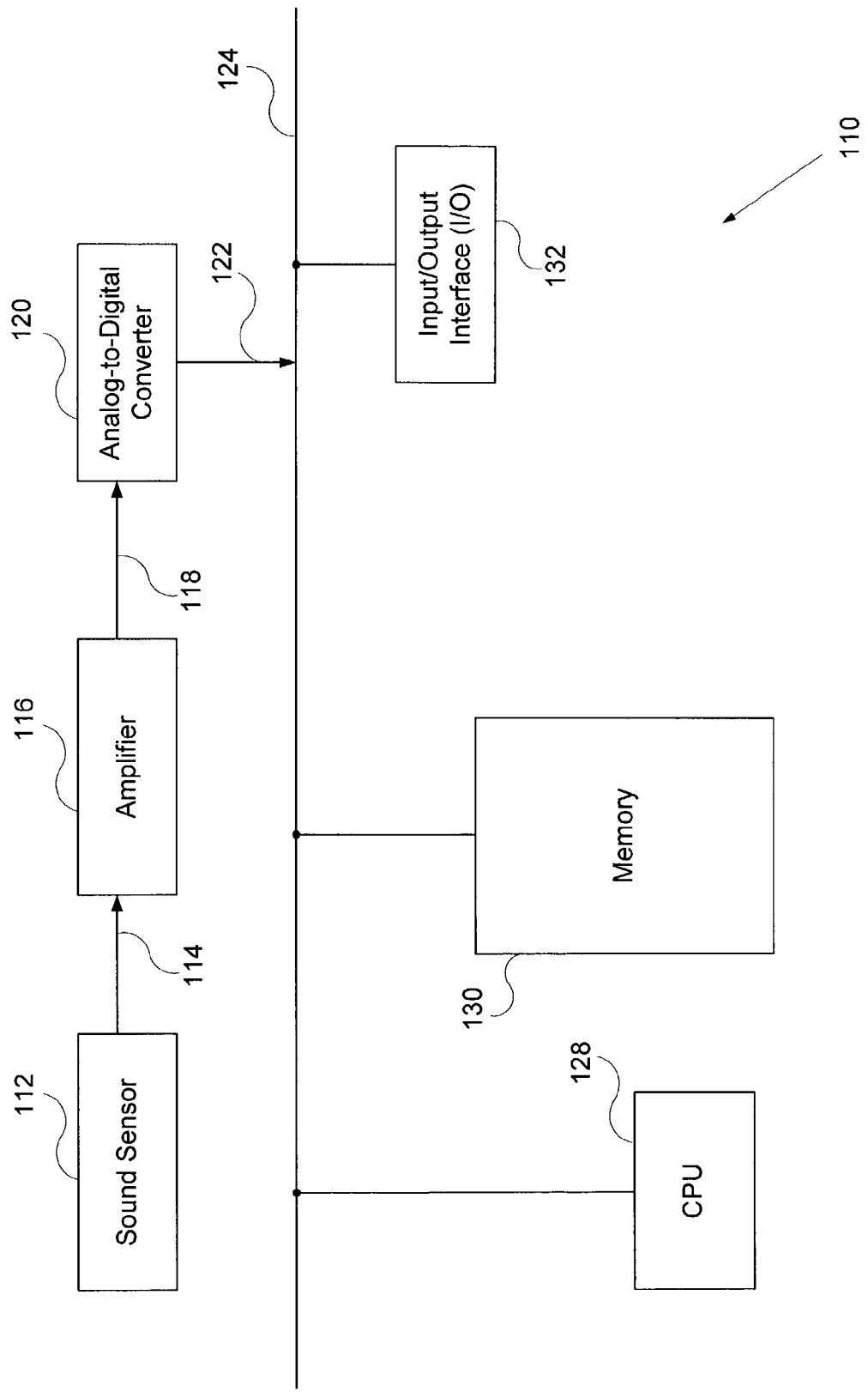
FIG. 1 is a block diagram for one embodiment of a computer system, in accordance with the present invention.

Referring now to FIG. 1, a block diagram for one embodiment of a computer system 110 is shown, according to the present invention. The FIG. 1 embodiment includes a sound sensor 112, an amplifier 116, an analog-to-digital converter 120, a central processing unit (CPU) 128, a memory 130, and an input/output interface 132. In alternate embodiments, computer system 110 may readily include various other elements or functionalities in addition to, or instead of, those elements or functionalities discussed in conjunction with the FIG. 1 embodiment.

Sound sensor 112 detects sound energy and converts the detected sound energy into an analog speech signal that is provided via line 114 to amplifier 116. Amplifier 116 amplifies the received analog speech signal and provides the amplified analog speech signal to analog-to-digital converter 120 via line 118. Analog-to-digital converter 120 then converts the amplified analog speech signal into corresponding digital speech data. Analog-to-digital converter 120 then provides the digital speech data via line 122 to system bus 124.

CPU 128 may then access the digital speech data on system bus 124 and responsively analyze and process the digital speech data to perform speech detection according to software instructions contained in memory 130. The operation of CPU 128 and the software instructions in memory 130 are further discussed below in conjunction with FIGS. 2-3. After the speech data is processed, CPU 128 may then provide the results of the speech detection analysis to other devices (not shown) via input/output interface 132. In alternate embodiments, the present invention may readily be embodied in various devices other than the computer system 110 shown in FIG. 1. Furthermore, the present invention may be embodied in various types of recognition systems other than the FIG. 1 speech recognition system. For example, the present invention may be utilized to perform an automatic set-up procedure for an image recognition system.

Figure 2:
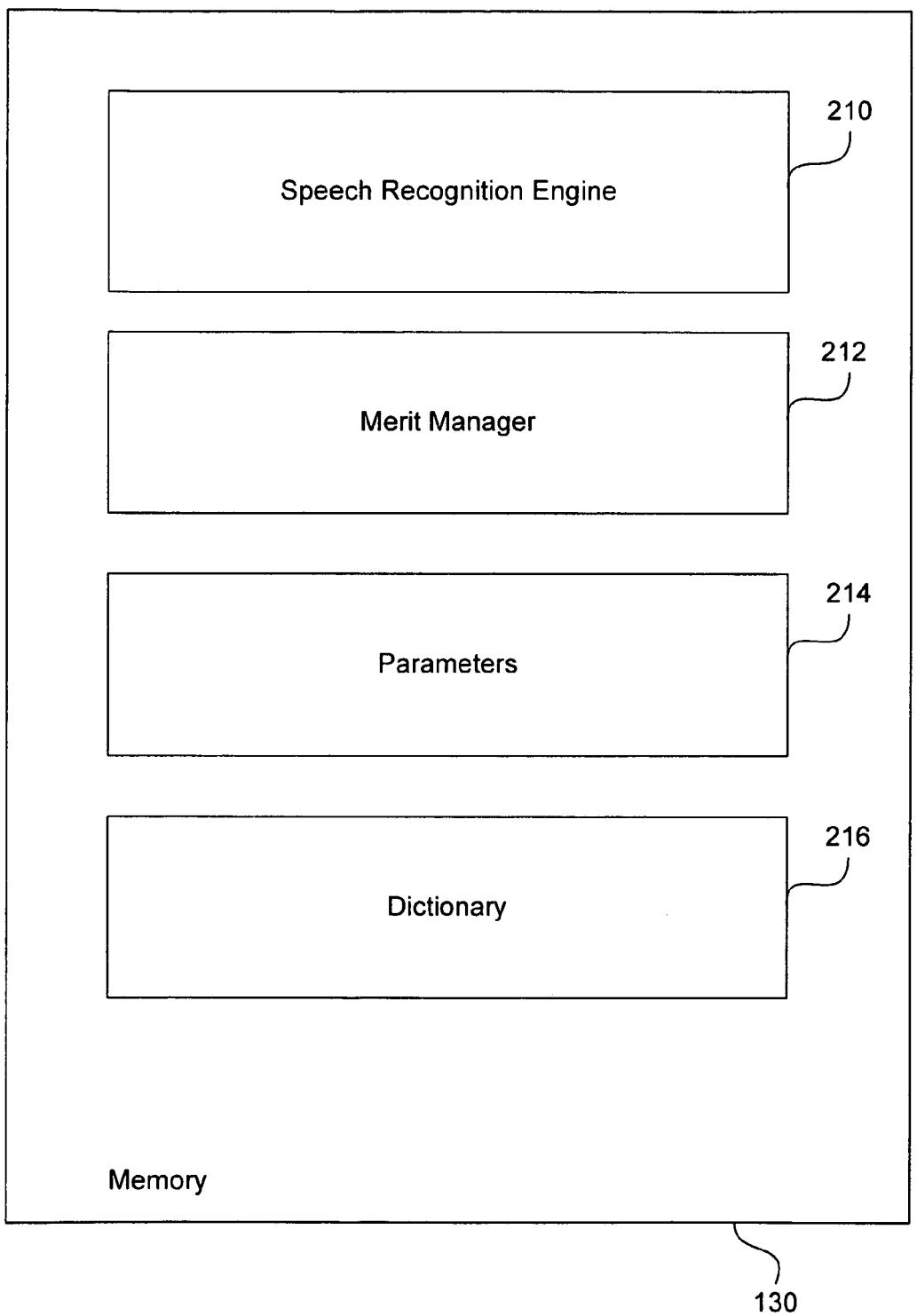
FIG. 2 is a block diagram for one embodiment of the memory of FIG. 1, in accordance with the present invention.

Referring now to FIG. 2, a block diagram for one embodiment of the FIG. 1 memory 130 is shown, according to the present invention. Memory 130 may alternately comprise various storage-device configurations, including random access memory (RAM) and storage devices such as floppy discs or hard disc drives. In the FIG. 2 embodiment, memory 130 includes, but is not limited to, a speech recognition engine 210, a merit manager 212, and one or more parameters 214. In alternate embodiments, memory 130 may readily include various other elements or functionalities in addition to, or instead of, those elements or functionalities discussed in conjunction with the FIG. 2 embodiment.

In the FIG. 2 embodiment, speech recognition engine 210 may include a series of software modules that are executed by CPU 128 to analyze and recognize input speech data. Speech recognition engine 210 is further described below in conjunction with FIG. 3. In alternate embodiments, speech recognition engine 210 may readily be implemented using various other software and/or hardware configurations.

In accordance with the present invention, merit manager 212 may be utilized to advantageously optimize certain performance attributes of speech recognition engine 210 by selectively controlling parameters 214. In the FIG. 2 embodiment, parameters 214 may define various operating characteristics of speech recognition engine 210. Parameters 214 may typically include any operating characteristics that affect performance attributes of speech recognition engine 210 such as recognition accuracy and recognition speed. For example, parameters 214 may include, but are not limited to, a beam width that limits recognition scores considered by speech recognition engine 210, or any other type of search restrictions utilized. The utilization of merit manager 212 and parameters 214 is further discussed below in conjunction with FIGS. 4-7.

Figure 3:
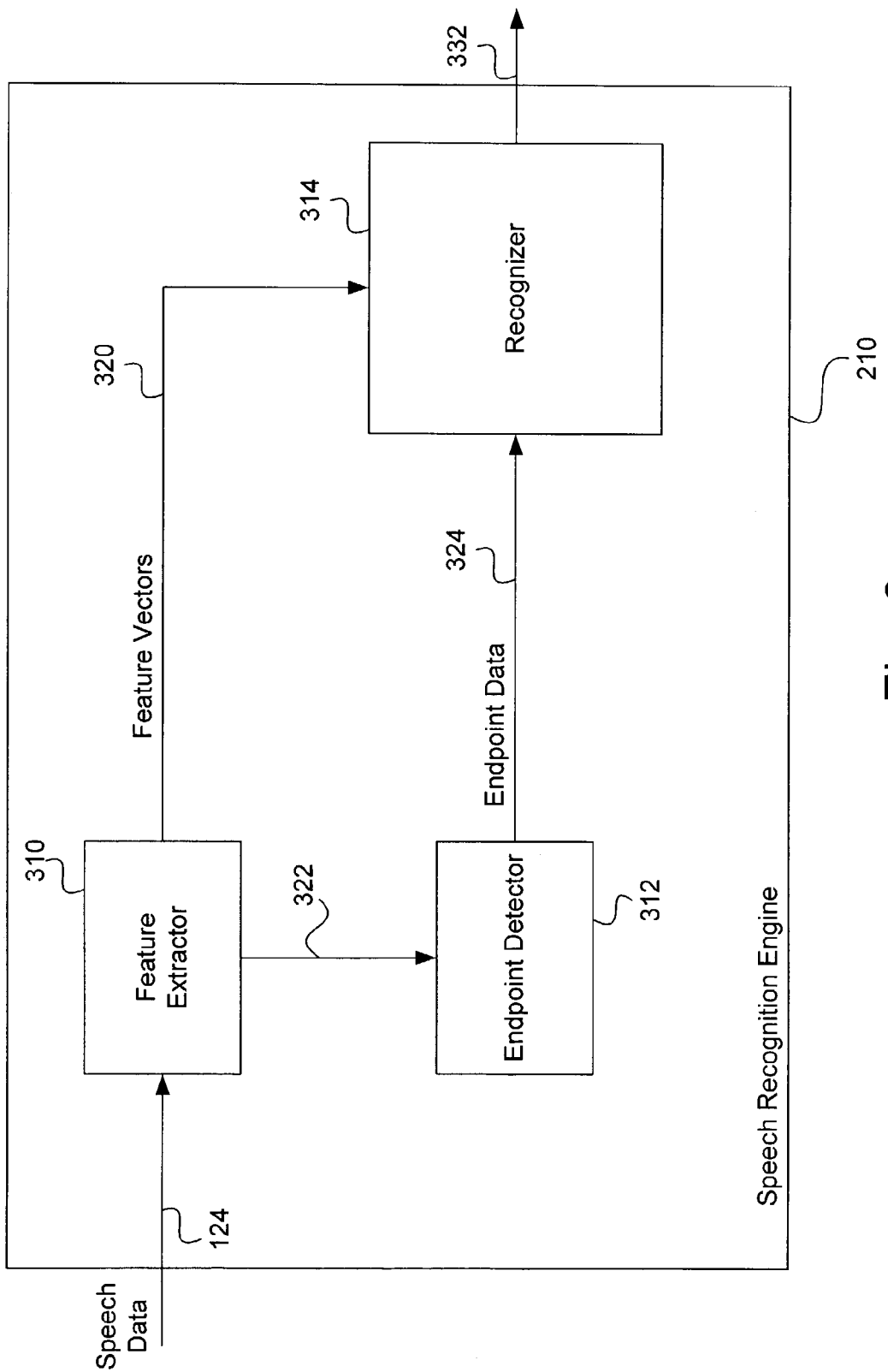
FIG. 3 is a block diagram for one embodiment of the speech recognition engine of FIG. 2, in accordance with the present invention.

Referring now to FIG. 3, a block diagram for one embodiment of the speech recognition engine 210 of FIG. 2 is shown, according to the present invention. Speech recognition engine 210 includes, but is not limited to, a feature extractor 310, an endpoint detector 312, and a recognizer 314. In alternate embodiments, speech recognition engine 210 may readily include various other elements or functionalities in addition to, or instead of, those elements or functionalities discussed in conjunction with the FIG. 3 embodiment.

In the FIG. 3 embodiment, an analog-to-digital converter 120 (FIG. 1) provides digital speech data to feature extractor 310 via system bus 124. Feature extractor 310 responsively generates feature vectors, which are provided to recognizer 314 via path 320. Feature extractor 310 further responsively generates speech energy to endpoint detector 312 via path 322. Endpoint detector 312 analyzes the speech energy and responsively determines endpoints of an utterance represented by the speech energy. The endpoints indicate the beginning and end of the utterance in time. Endpoint detector 312 then provides the endpoints to recognizer 314 via path 324.

Recognizer 314 is preferably configured to recognize a word sequence in a predetermined vocabulary which is represented in dictionary 216 (FIG. 2). The foregoing word sequences in dictionary 216 may correspond to any desired commands, instructions, or other communications for computer system 110. Recognized word sequences may then be output to system 110 via path 332.

In practice, each word sequence from a vocabulary dictionary may be associated with a corresponding phone string (string of individual phones) which represents that word. Hidden Markov Models (HMMs) may include trained stochastic representations for each of the phones from a predetermined phone set that may effectively be utilized to represent the word sequences in the vocabulary dictionary. Recognizer 314 may then compare input feature vectors from line 320 with appropriate HMMs for each of the phone strings from the vocabulary dictionary to determine which word sequence produces the highest recognition score. The word sequence corresponding to the highest recognition score may thus be identified as the recognized word sequence.

Figure 4C:
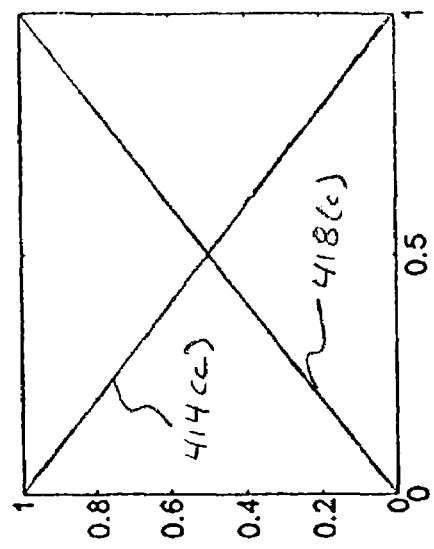
FIGS. 4A, 4B, and 4C are a graphs illustrating membership functions for a fuzzification procedure, in accordance with one embodiment of the present invention.
Figure 4B:
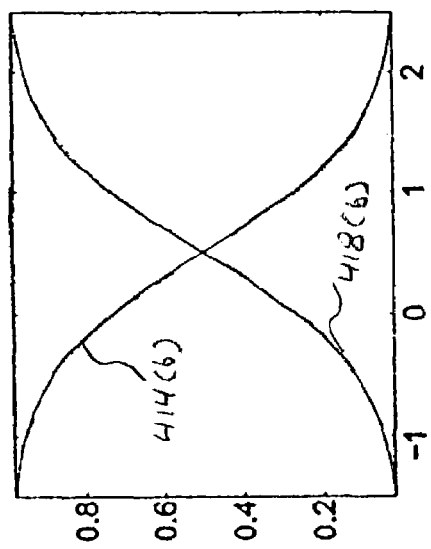
Figure 4A:
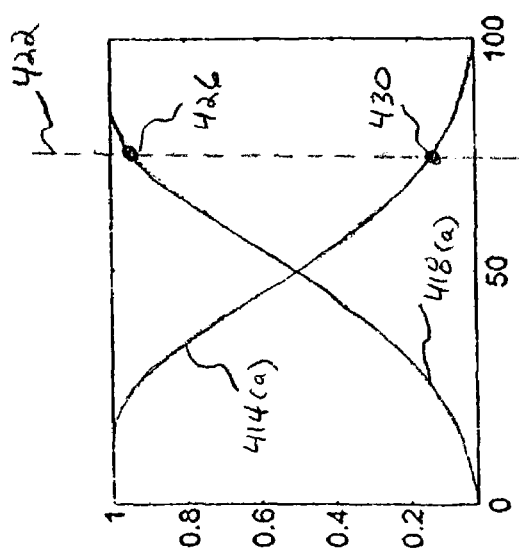

Referring now to FIGS. 4A, 4B, and 4C, graphs 410(a), 410(b), and 410(c) illustrating membership functions for a fuzzification procedure to derive a merit value are shown, in accordance with one embodiment of the present invention. In alternate embodiments, the present invention may derive merit values by utilizing various other techniques in addition to, or instead of, those techniques discussed in conjunction with the embodiment of FIGS. 4A, 4B, and 4C.

The present invention includes an automatic method to set-up the several parameters 214 that define the behavior and performance of a speech recognition engine 210. Such parameters 214 may include weights and beam widths among others. The method of the present invention is based on the definition of a merit function. Here, merit is understood as an intuitive notion of recognition performance based on both recognition accuracy and computation time. A convenient definition of merit allows the application of an optimization procedure to define a convenient set-up for speech recognition engine 210 with little human intervention.

For speech recognition in systems and devices used in everyday life, accurate recognition performance is important. However, for a practical application, issues about real-time performance and memory usage cannot be ignored. Accurate acoustic and language models are a pre-requisite for high recognition accuracy. However they usually also imply the need for significant computational resources, which are not always available. For a practical system, it is therefore necessary to limit the use of such resources while maintaining accuracy.

For this purpose, a number of approximations, look-ahead techniques and other compromises (such as limitation of search space, introduction of flooring values, etc.) generally are employed. These techniques do impact the recognition performance when used carelessly. Careful tuning of the parameters 214 controlling these techniques, such as beamwidths, look-ahead depths, parameters controlling approximate calculations and the like, is required.

This usually results in a cumbersome process which requires many experiments to be done under the guidance of experienced users, making the system performance dependent on personal knowledge and experience. Furthermore, many of these parameters 214 appear to be dependent on the actual acoustic and language models, implying that when these change, the tuning process needs to be repeated for optimal performance. Whether this tuning is done by "brute force", meaning testing a huge number of parameter settings, tabulating the results and finding the optimum, or by a systematic parameter optimization, in either case a huge number of experiments under human supervision is required.

The number of experiments required increases as more parameters 214 for system optimization are introduced. The present invention proposes an innovative method to adjust the recognition parameters 214 through optimization with little input from the system user. Optimization is based on defining the merit of each recognition experiment. Merit is a subjective notion suitable to be evaluated in a natural way through soft computation based on fuzzy logic. Merit may be understood as a function that depends on the configuration of speech recognition engine 210 and on its set-up. When used as a cost function, the merit can be a basis for finding an optimal set-up of a given speech recognition engine 210.

In speech recognition engine 210, overall performance depends on a combination of system attributes such as Word Error Rate (WER) reflecting recognition accuracy, memory capacity, and Real Time Factors (RTF) reflecting recognition speed, which need to be jointly optimized. In the FIG. 4 embodiment, only two attributes are utilized: WER and RTF. However, in various other embodiments, any suitable attribute may be utilized. In speech recognition, a trade-off between WER and RTF seems apparent: for less recognition errors, more computation time is needed. For practical purposes, a recognition system yielding high accuracy at high operational speed is very desirable. In the evaluation of speech recognition performance, the FIG. 4 embodiment combines WER and RTF to express a joint assessment of merit. This joint measure or merit value may be regarded as recognition merit.

Intuitive and subjective knowledge are hard to include into numeric computation unless they are added in a heuristic manner. Fuzzy logic represents an adequate theoretical framework to efficiently handle subjective notions in a formal representation. Such a fuzzy logic system may based on membership functions and fuzzy rules which, when properly defined, may combine real-life numeric measurements with intuitive knowledge into a logical output result.

In an oversimplified description, basic steps involved in a fuzzy logic system may be summarized as follows: A fuzzification procedure initially maps input values into fuzzy notions. Then rules and inference are utilized to generate rule outputs from the fuzzy notions, and the rule outputs are combined into a single combined rule output. More specifically, "if . . . then" statements indicate how the fuzzy notions are combined. Finally, in some techniques (but not in the FIG. 4 embodiment), a defuzzification procedure maps back the combined rule output to an output value.

Fuzzy logic may be interpreted as a mapping tool capable of transforming intuition and linguistic operations into a systematic model built from elementary mathematical functions. The operations within a fuzzy logic system may be brought "down to earth" when expressed in basic mathematical terms. The fuzzification process includes a mapping of input values into predefined fuzzy sets. Each fuzzified input may then passed to a set of fuzzy rules.

Rules combine the fuzzy notions through the fuzzy "and" operator that, in this case, is the product of them all. Every rule produces a rule output that later may be averaged with the rest of the rule outputs to build a single unified fuzzy result or combined rule output. As discussed above, the foregoing defuzzification step is not used in the present invention because the merit value, a fuzzy notion, is our optimization target.

In the FIG. 4 embodiment, merit manager 212 may utilize a fuzzy logic module (not shown) with three input values and one combined output (the merit value). In the FIG. 4 embodiment, the input values may include the WER and the log of RTF which may be determined in any effective manner. For example, in certain embodiments, recognizer 314 (FIG. 3) may calculate input values such as WER and log of RTF after performing a corresponding speech recognition procedure.

Logarithmic values of the computation time may be used to restrict the dynamic range of this variable. There is a third input in a user-specified value called the "WER over RTF" (WOT) value conceived to balance the tradeoff between WER and RTF during recognition. For high WOT values, accuracy is more relevant than speed. The actual value of WOT is important to the entire optimization process since it greatly affects the shape of the cost function and thus changes the point reached during optimization. In formulae, our fuzzy logic system brings a definition of a merit value, M (Setup), for a certain parameter set-up of speech recognition engine 210, according to a following Equation (1):

$$M(\text{Setup}) = \frac{\sum_r \left( z(r) \prod_{x \in X} f(x) \right)}{\sum_r \left( \prod_{x \in X} f(x) \right)}$$

where r is a fuzzy rules index depending upon the number of fuzzy rules, and M (Setup) represents the fact that the merit value is a function of the parameter setup. The fuzzy system inputs, X={W (Setup); log R (Setup); WOT}, are functions of speech recognition engine 210 set-up (Setup): a set of recognition parameters 214 (weights, lengths or ranges) that define the behavior of speech recognition engine 210.

For fuzzy merit computation, the membership functions, $f(x)$, are sigmoidal for W (Setup) and log R (Setup), and are linear for WOT. The combination of rules is given by the product in foregoing Equation (1). Each combination may produce the foregoing combined rule output which may later be weighted with a constant value z(r) associated with each rule. The combined rule output (the merit value) may thus be the result of the weighted average of all rule outputs.

The actual implementation of the fuzzy logic module to measure the merit depends on: 1) the definition of membership functions to fuzzify the inputs values into fuzzy values, and 2) the rules to define relationship between the fuzzy values. In the FIG. 4 embodiment, each input value to the fuzzy logic module may be characterized by two pre-defined fuzzy membership sets: a high membership function, and a low membership function. FIGS. 4A, 4B, and 4C each show the membership functions used to define high values and low values for each input value.

More specifically, FIG. 4A shows a low membership function 414(a); and a high membership function 418(a) for WER. Similarly, FIG. 4B shows a low membership function 414(b) and a high membership function 418(b) for RTF. In addition, FIG. 4C shows a low membership function 414(c) and a high membership function 418(c) for WOT. For purposes of illustration, an exemplary input WER value is shown in FIG. 4A at the point that line 422 intersects the horizontal axis of graph 410(a). A first fuzzy notion 430 may then be identified on the vertical axis at the point 430 where line 422 intersects low membership function 414(a). In addition, second fuzzy notion 426 may then be identified on the vertical axis at the point 426 where line 422 intersects high membership function 418(a).

Similar procedures may then be performed with input values for FIG. 4B and FIG. 4C to produce, in this embodiment, six separate fuzzy notions that may then be combined through a fuzzy logic rule set. The utilization of a fuzzy logic rule set to effectively combine fuzzy notions into a combined rule output or merit value is further discussed below in conjunction with FIG. 5.

Referring now to FIG. 5, a diagram of a fuzzy logic rule set 510 is shown, in accordance with one embodiment of the present invention. The FIG. 5 embodiment is presented for purposes of illustration, and in alternate embodiments, the present invention may readily utilize fuzzy logic rule sets with various other elements or configurations in addition to, or instead of, those elements or functionalities discussed in conjunction with the FIG. 5 embodiment.

The fuzzy logic rule set 510 of FIG. 5 may be utilized by merit manager 212 (FIG. 2) to define a merit value for a corresponding speech recognition procedure. In the notation used, "low" and "high" may be fuzzy notion levels on either side of a pre-determined low/high threshold level that may be selectively chosen when implementing fuzzy logic rule set 510. The combination of fuzzy values in each rule is later to be multiplied by the z value of that rule to provide rule output values which may then be averaged to compute the merit value, M (setup), according to foregoing Equation (1). The basic notion for recognition merit (M (setup)) stated above (for WER low and RTF low, merit high) is included in rules 1 and 2. FIG. 5 graphically shows the merit value, as a function of R (Setup) and W (Setup), computed through the fuzzy logic system described above.

In the FIG. 5 embodiment, fuzzy logic rule set 510 includes the following rules: Rule 1 states that if WER is low and RTF is low and WOT is low, then z=1; Rule 2 states that if WER is low and RTF is low and WOT is high, then z=1; Rule 3 states that if WER is high and RTF is low and WOT is low, then z=0; Rule 4 states that if WER is high and RTF is high and WOT is low, then z=1; Rule 5 states that if WER is high and RTF is low and WOT is low, then z=1; Rule 6 states that if WER is high and RTF is low and WOT is high, then z=0; Rule 7 states that if WER is high and RTF is high and WOT is low, then z=0; and Rule 8 states that if WER is high and RTF is high and WOT is high, then z=0. In alternate embodiments, fuzzy logic rule set 510 may be implemented with various rules other that those shown in the FIG. 5 embodiment.

Figure 6:
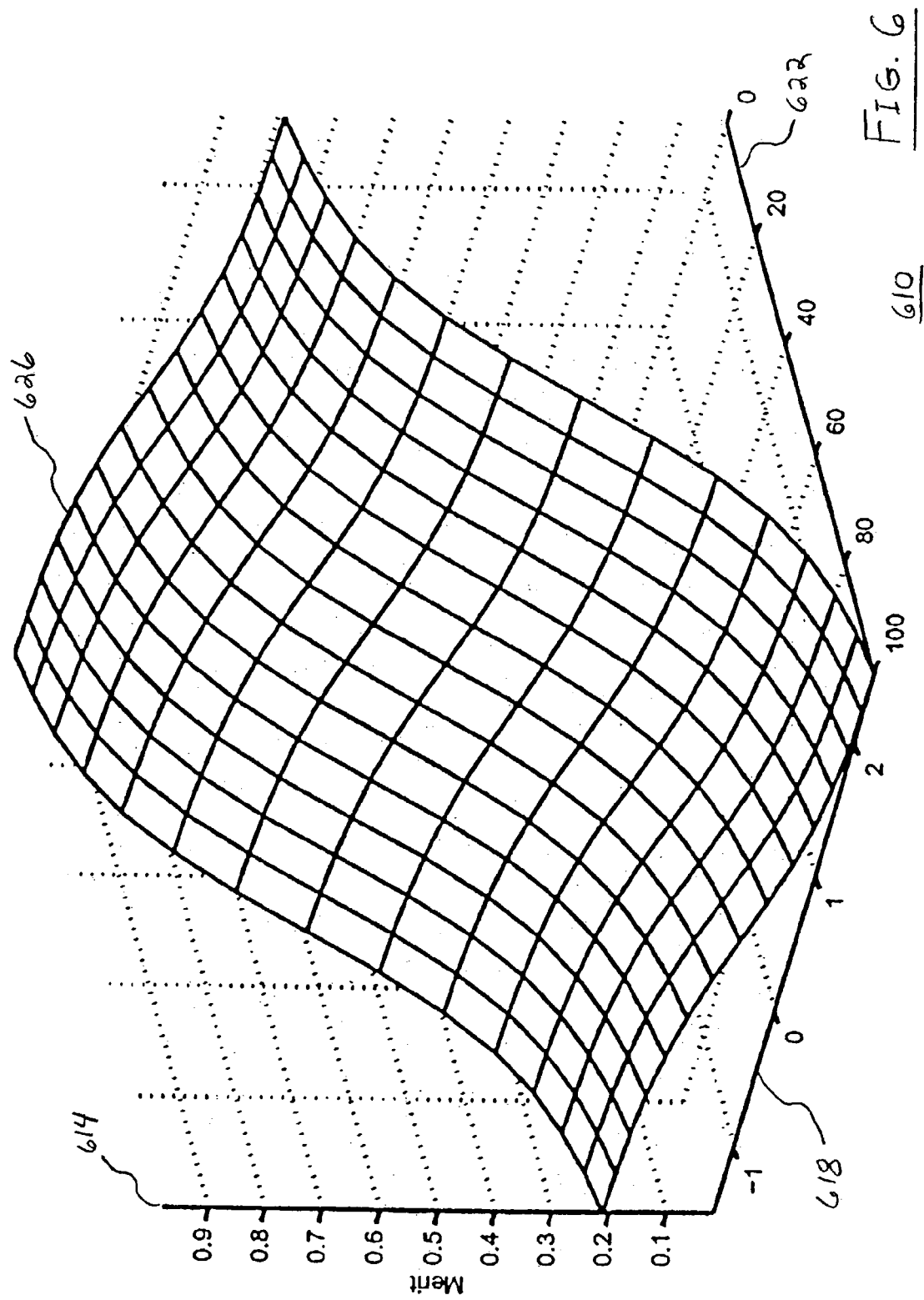
FIG. 6 is a graph illustrating a merit value optimization procedure, in accordance with one embodiment of the present invention.

Referring now to FIG. 6, a graph 610 illustrating a merit value optimization procedure is shown, in accordance with one embodiment of the present invention. In alternate embodiments, the present invention may readily perform merit value optimization procedures using various other techniques in addition to, or instead of, those techniques discussed in conjunction with the FIG. 6 embodiment.

In the FIG. 6 embodiment, merit manager 212 may perform a merit value optimization procedure to seek a set-up of parameters 214 (FIG. 2) that produces the best merit value for speech recognition procedures. In practice, an absolute optimal merit (for WER and RTF=0) may not be reached. However, numeric optimization on real values of M(Setup) may help to define a practical optimum. Each element of the recognizer set-up procedure, a recognition parameter 214 itself, may be optimized in the steepest ascent direction for a pre-determined number of optimization iterations.

In the FIG. 6 embodiment, graph 610 includes a vertical axis 614 for merit values, a first horizontal axis 618 for log RTF values, and a second horizontal axis 622 for WER values. Graph 610 also shows a monotonical surface 626 representing all available merit values. In accordance with the present invention, merit manager 212 may perform the merit value optimization procedure by seeking to maximize the current merit value on surface 626. Merit manager 212 may thus perform merit value optimization procedure in a series of optimization segments that successively move in an ascending direction.

In practice, merit manager 212 may approximate an ascending gradient for each optimization segment by computing a difference between a current merit value and a next merit value on surface 626. So, for every parameter 214, the foregoing difference may be computed by slightly changing the value of the current parameter 214 in question and then performing speech recognition. Afterwards, the new merit value may be evaluated and compared against the initial merit to obtain the difference for the gradient. An adaptive learning rate may be utilized so that optimization may be efficiently conducted. The value of the parameter update is a function of the direction of the gradient and the learning rate.

RProp (resilient propagation) is one method that adapts the individual learning rate of each parameter 214 according to the direction of its gradient and not to the actual gradient value. Since this is a method that updates each parameter independently, as if the others did not exist, strictly speaking it is not a gradient search method but a local optimization one. However, in a problem like this, its approximation to the gradient may be sufficient. Since RProp considers the local gradients of previous iterations, it can be thought of as a second order method.

For optimization to start, recognizer 314 (FIG. 3) is given initial setup values (such as parameters 214) and a vector of initial updates (one for each parameter) may be defined. After computing all the local gradients for selected adjacent merit values, the setup values may be updated all at once in a "learning by epoch" fashion. The utilization of a merit value optimization procedure is further discussed below in conjunction with FIG. 7.

Figure 7:
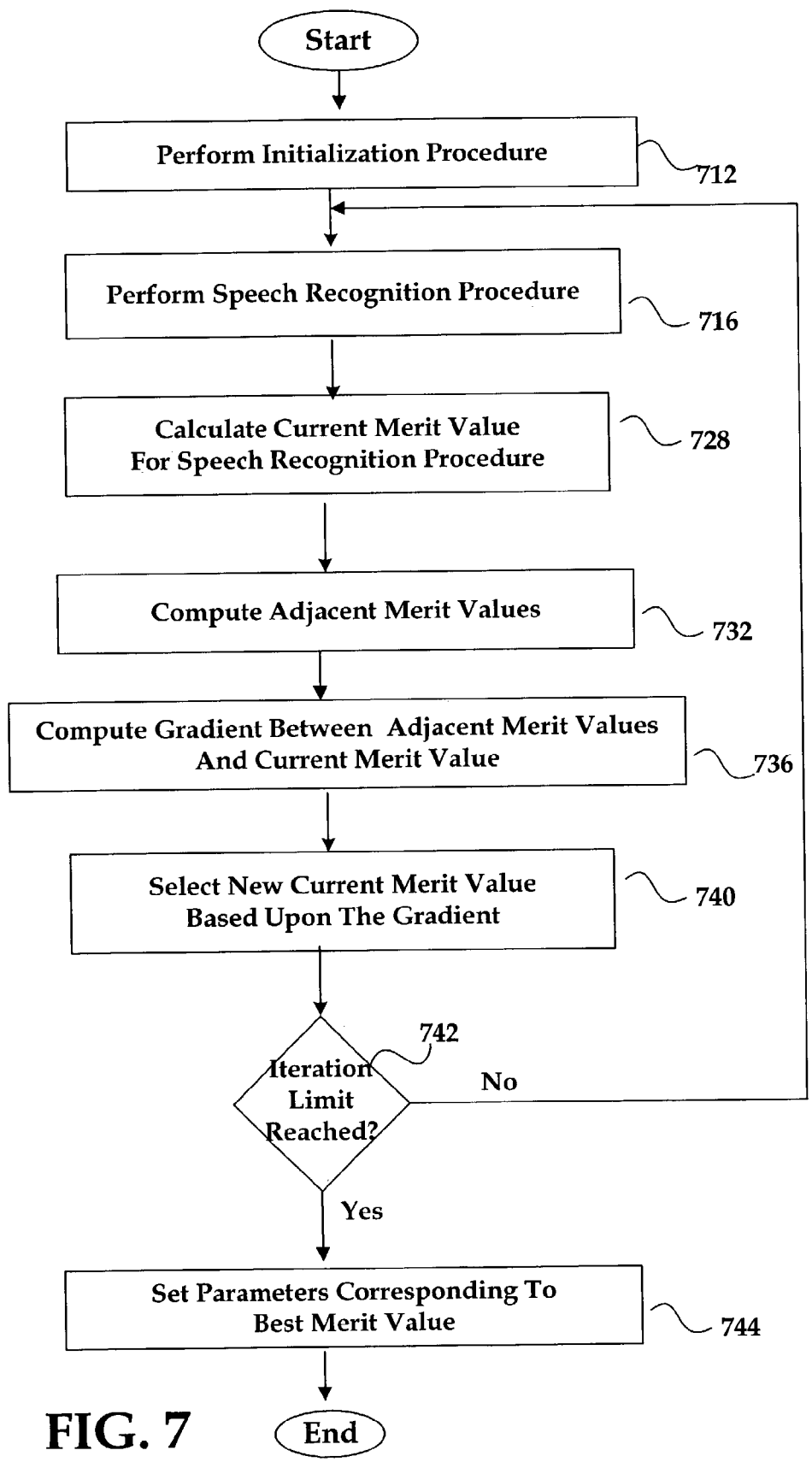
FIG. 7 is a flowchart of method steps for an automatic set-up of speech recognition engines, in accordance with one embodiment of the present invention.

Referring now to FIG. 7, a flowchart of method steps for an automatic set-up procedure for speech recognition engines is shown, in accordance with one embodiment of the present invention. The FIG. 7 example is presented for purposes of illustration, and in alternate embodiments, the present invention may readily utilize various steps and sequences other than those discussed in conjunction with the FIG. 7 embodiment.

In the FIG. 7 embodiment, in step 712, a system user or other appropriate entity may perform an initialization procedure to specify certain initialization values for speech recognition engine 210 (FIG. 2). For example, in the FIG. 7 embodiment, the foregoing initialization values may include, but are not limited to, a WOT value, parameters 214 (FIG. 2), parameter updates, a total number of optimization iterations (iteration limit), and movement restrictions for a merit value optimization procedure.

The foregoing movement restrictions define that the limits within every parameter have a practical meaning. For instance, a beam width of value zero cancels every possible recognition output. Thus, to avoid abnormal recognition function, it has to be explicitly specified to the automatic set-up system that the value for the width parameter has to be greater than zero. Similarly, some parameters in the set-up (such as the number of speech samples to consider in every recognition try), can only take integer values. Such practical conditions limit the free movement of the parameter values during optimization. In the automatic set-up, the movement restrictions are applied in a conditional manner so the parameters values have a practical meaning. For example, if the optimization dictates that the width parameter has to be zero, then the movement restrictions override such a value to make it meaningful for the recognizer.

In step 716, recognizer 314 may perform a speech recognition procedure with input speech data to generate a corresponding Word Error Rate (WER) and Real Time Factors (RTF). Next, in step 728, a fuzzy logic module of merit manager 212 may utilize the foregoing WER, RTF, and WOT as input values to calculate a current merit value for the previous speech recognition procedure.

Then in step 732, during an iteration of the merit value optimization procedure, recognizer 314 may perform several additional speech recognition procedures with different parameters 214 so that merit manager 212 can compute adjacent merit values in the neighborhood of the current merit value. In step 736, merit manager 212 may compute a gradient between the adjacent merit values and the current merit value. In step 740, merit manager 212 may select a new current merit value from among the calculated adjacent merit values based upon a maximum ascending direction from the foregoing gradient.

In step 742, merit manager 212 may determine whether the pre-defined iteration limit has been reached. In the event that the pre-defined iteration limit has not been reached, then the FIG. 7 process may return to step 716 to repeat another iteration of the automatic set-up procedure for speech recognition engine 210. However, in step 742, if the pre-defined iteration limit has been reached, then in step 744, merit manager 212 may set parameters 214 to the optimized values corresponding to the best merit value from all prior iterations of the FIG. 7 process to thereby conclude the automatic set-up procedure. The FIG. 7 process may then terminate.

The invention has been explained above with reference to preferred embodiments. Other embodiments will be apparent to those skilled in the art in light of this disclosure. For example, the present invention may readily be implemented using configurations and techniques other than those described in the preferred embodiments above. Additionally, the present invention may effectively be used in conjunction with systems other than those described above as the preferred embodiments. Therefore, these and other variations upon the preferred embodiments are intended to be covered by the present invention, which is limited only by the appended claims.

What is claimed is:

1. A system for effectively performing a set-up procedure, comprising:

a recognizer that performs recognition procedures to analyze input data for generating a recognition result, said recognizer functioning according to one or more parameters that are user-selectable to define operating characteristics of said recognition procedures; and a merit manager that iteratively calculates merit values corresponding to respective ones of said recognition procedures, at least one of said parameters being altered before each of said recognition procedures, said merit values quantifying overall performance characteristics of said recognition procedures, said recognizer and said merit manager being stored on a computer-readable medium that includes computer-executable instructions for causing an electronic device to perform said computer-executable instructions, said merit manager selecting, from said one or more parameters, optimal parameters corresponding to an optimal merit value from said merit values, said input data being speech data, and said recognition procedures being speech recognition procedures, said set-up procedure being performed automatically by said recognizer and said merit manager, said merit values incorporate recognition accuracy information, recognition speed information, and a user-specified weighting factor that shifts relative effects of said recognition accuracy information and said recognition speed information on said merit values, said recognizer performing one of said recognition procedures, said recognizer then calculating a WER corresponding to said recognition accuracy information, and a RTF corresponding to said recognition speed information, said WER being a Word-Error-Rate and said RTF being a Real-Time-Factor, said merit manager calculating one of said merit values corresponding to said one of said recognition procedures based upon merit input values that include said WER, said RTF, and a WOT which is equal to said user-specified weighting factor, said merit manager performing a fuzzification procedure to map said merit input values to corresponding fuzzy notions, said fuzzy notions being processed with rules from a fuzzy rule set to produce fuzzy rule outputs, said fuzzy rule outputs then being combined by an averaging operation to produce said one of said merit values, said fuzzy rule set being implemented as follows: Rule 1 states that if said WER is low and said RTF is low and said WOT is low, then z=1; Rule 2 states that if said WER is low and said RTF is low and said WOT is high, then said z=1; Rule 3 states that if said WER is high and said RTF is low and said WOT is low, then said z=0; Rule 4 states that if said WER is high and said RTF is high and said WOT is low, then said z=1; Rule 5 states that if said WER is high and said RTF is low and said WOT is low, then said z=1; Rule 6 states that if said WER is high and said RTF is low and said WOT is high, then said z=0; Rule 7 states that if said WER is high and said RTF is high and said WOT is low, then said z=0; and Rule 8 states that if said WER is high and said RTF is high and said WOT is high, then said z=0, said z representing different ones of said fuzzy rule outputs.

2. The system of claim 1 wherein said one or more parameters are operating characteristics that affect performance attributes of said recognizer, said one or more parameters including a beam width that limits recognition scores considered by said recognizer.

3. The system of claim 1 wherein said merit manager performs a merit value optimization procedure by iteratively seeking gradually, improving merit scores to arrive at said optimal merit value.

4. The system of claim 1 wherein a system user performs an initialization procedure to prepare said merit manager and said recognizer for said set-up procedure.

5. The system of claim 1 wherein said system user specifies initialization values during said initialization procedure, said initialization values including said WOT for weighting other factors of said merit values, said WOT being said Word-Error-Rate over said Real-Time-Factor, initial settings for said one or more parameters, initial updates, an optimization procedure iteration limit for a merit value optimization procedure, and movement restrictions for said merit value optimization procedure.

6. The system of claim 1 wherein each of said merit input values is mapped to both a high membership function fuzzy notion and a low membership function fuzzy notion.

7. The system of claim 1 wherein a merit value, M (Setup), for a given parameter set-up of said recognizer is expressed according to a following equation:

$$M(\text{Setup}) = \frac{\sum_r \left( z(r) \prod_{x \in X} f(x) \right)}{\sum_r \left( \prod_{x \in X} f(x) \right)}$$

where r is a fuzzy rules index and said z is a weighting value associated with corresponding ones of said rules.

8. The system of claim 1 wherein said merit manager performs a merit value optimization procedure in which successively improving ones of said merit values are locating by adjusting said one or more parameters in an iterative manner.

9. The system of claim 8 wherein said merit manager computes adjacent merit values to a current merit value, said merit manager then calculating a gradient based upon relationships between said current merit value and said adjacent merit values.

10. The system of claim 9 wherein said merit manager selects a new current merit value as one of said successively improving ones of said merit values based upon an optimal ascending characteristic of said gradient.

11. The system of claim 10 wherein said merit manager continues to perform additional iterations to locate said successively improving ones of said merit values until a predetermined iteration limit is reached.

12. The system of claim 11 wherein said merit manager completes said set-up procedure by setting said one or more parameters to said optimal parameters corresponding to said optimal merit value from all of said iterations of said merit value optimization procedure.

13. A method for effectively performing a set-up procedure, comprising the steps of:
performing recognition procedures with a recognizer to analyze input data for generating a recognition result, said recognizer functioning according to one or more parameters that are user-selectable to define operating characteristics of said recognition procedures; and
utilizing a merit manager to iteratively calculate merit values corresponding to said recognition procedures, at least one of said parameters being altered before each of said recognition procedures, said merit values quantifying overall performance characteristics of said recognition procedures, said recognizer and said merit manager being stored on a computer-readable medium that includes computer-executable instructions for causing an electronic device to perform said computer-executable instructions, said merit manager selecting, from said one or more parameters, optimal parameters corresponding to an optimal merit value from said merit values, said input data being speech data, and said recognition procedures being speech recognition procedures, said set-up procedure being performed automatically by said recognizer and said merit manager, said merit values incorporating recognition accuracy information, recognition speed information, and a user-specified weighting factor that shifts relative effects of said recognition accuracy information and said recognition speed information on said merit values, said recognizer performs one of said recognition procedures, said recognizer then calculating a WER corresponding to said recognition accuracy information, and a RTF corresponding to said recognition speed information, said WER being a Word-Error-Rate and said RTF being a Real-Time-Factor, said merit manager calculating one of said merit values corresponding to said one of said recognition procedures based upon merit input values that include said WER, said RTF, and a WOT which is equal to said user-specified weighting factor, said merit manager performing a fuzzification procedure to map said merit input values to corresponding fuzzy notions, said fuzzy notions being processed with rules from a fuzzy rule set to produce fuzzy rule outputs, said fuzzy rule outputs then being combined by an averaging operation to produce said one of said merit values, said fuzzy rule set being implemented as follows: Rule 1 states that if said WER is low and said RTF is low and said WOT is low, then z=1; Rule 2 states that if said WER is low and said RTF is low and said WOT is high, then said z=1; Rule 3 states that if said WER is high and said RTF is low and said WOT is low, then said z=0; Rule 4 states that if said WER is high and said RTF is high and said WOT is low, then said z=1; Rule 5 states that if said WER is high and said RTF is low and said WOT is low, then said z=1; Rule 6 states that if said WER is high and said RTF is low and said WOT is high, then said z=0; Rule 7 states that if said WER is high and said RTF is high and said WOT is low, then said z=0; and Rule 8 states that if said WER is high and said RTF is high and said WOT is high, then said z=0, said z representing different ones of said fuzzy rule outputs.

14. The method of claim 13 wherein said one or more parameters are operating characteristics that affect performance attributes of said recognizer, said one or more parameters including a beam width that limits recognition scores considered by said recognizer.

15. The method of claim 13 wherein said merit manager performs a merit value optimization procedure by iteratively seeking gradually improving merit scores to arrive at said optimal merit value.

16. The method of claim 13 wherein a system user performs an initialization procedure to prepare said merit manager and said recognizer for said set-up procedure.

17. The method of claim 13 wherein said system user specifies initialization values during said initialization procedure, said initialization values including said WOT for weighting other factors of said merit values, said WOT being said Word-Error-Rate over said Real-Time-Factor, initial settings for said one or more parameters, initial updates, an optimization procedure iteration limit for a merit value optimization procedure, and movement restrictions for said merit value optimization procedure.

18. The method of claim 17 wherein said movement restrictions for said merit value optimization procedure are selected to create limits within certain of said parameters to thereby provide a practical meaning by limiting a free movement of corresponding parameter values during said merit value optimization procedure.

19. The method of claim 13 wherein each of said merit input values is mapped to both a high membership function fuzzy notion and a low membership function fuzzy notion.

20. The method of claim 13 wherein a merit value, M (Setup), for a given parameter set-up of said recognizer is expressed according to a following equation:

$$M(\text{Setup}) = \frac{\sum_r \left( z(r) \prod_{x \in X} f(x) \right)}{\sum_r \left( \prod_{x \in X} f(x) \right)}$$

where r is a fuzzy rules index and said z is a weighting value associated with corresponding ones of said rules.

21. The method of claim 13 wherein said merit manager performs a merit value optimization procedure in which successively improving ones of said merit values are locating by adjusting said one or more parameters in an iterative manner.

22. The method of claim 21 wherein said merit manager computes adjacent merit values to a current merit value, said merit manager then calculating a gradient based upon relationships between said current merit value and said adjacent merit values.

23. The method of claim 22 wherein said merit manager selects a new current merit value as one of said successively improving ones of said merit values based upon an optimal ascending characteristic of said gradient.

24. The method of claim 23 wherein said merit manager continues to perform additional iterations to locate said successively improving ones of said merit values until a predetermined iteration limit is reached.

25. The method of claim 13 wherein said parameters include a beam width, a look-ahead depth, control values for approximate calculations, a flooring value, a limitation of search memory, one or more weighting values, and a limitation of computational resources.

26. The method of claim 13 wherein said merit values are each a combined rule output of a fuzzy rule set that is equal to a weighted average of all rule outputs from said fuzzy rule set.

* * * * *